(12) United States Patent
McDonald et al.

(10) Patent No.: US 7,219,690 B2
(45) Date of Patent: May 22, 2007

(54) FLOW CONTROL VALVE

(75) Inventors: Chris H. McDonald, Yorba Linda, CA (US); Douglas R. Gastineau, Costa Mesa, CA (US); Richard Kunkel, Murrieta, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 240 days.

(21) Appl. No.: 10/799,169

(22) Filed: Mar. 11, 2004

(65) Prior Publication Data

US 2005/0199289 A1 Sep. 15, 2005

(51) Int. Cl.
*F16K 17/30* (2006.01)

(52) U.S. Cl. ................ 137/517; 137/512.1; 137/515.5; 251/118

(58) Field of Classification Search ............. 137/513.3, 137/512.1, 515, 515.5, 517, 550, 460, 498; 251/118; 138/40
See application file for complete search history.

(56) References Cited

U.S. PATENT DOCUMENTS

| | | | |
|---|---|---|---|
| 2,526,346 A * | 10/1950 | Goldinger ................ 137/512.1 |
| 2,601,654 A * | 6/1952 | Wright ........................ 137/515 |
| 3,406,715 A * | 10/1968 | Hruby, Jr. .................... 137/550 |
| 3,524,027 A | 8/1970 | Thurston et al. |
| 3,567,870 A | 3/1971 | Rivera |
| 4,635,287 A | 1/1987 | Hirano |
| 4,704,947 A * | 11/1987 | Schneider .................... 91/518 |
| 4,757,548 A | 7/1988 | Fenner, Jr. |
| 5,085,246 A * | 2/1992 | Griinke ....................... 137/504 |
| 5,215,113 A * | 6/1993 | Terry ........................... 137/460 |
| 5,473,700 A | 12/1995 | Fenner, Jr. |
| 6,830,064 B2 * | 12/2004 | Ji ................................ 137/517 |

* cited by examiner

*Primary Examiner*—Ramesh Krishnamurthy

(57) ABSTRACT

A two-stage fluid pressure control valve has five components. An inlet socket with separate fluid flow orifices sealably engages an outlet socket which also has separate fluid flow orifices. A pressure check piston having a fluid flow orifice along its longitudinal central axis slidably engages the inlet socket and the outlet socket. A spring located along the central axis of the outlet socket biases the pressure check piston in an open position, allowing fluid to flow through all orifices. Fluid flow through the control valve may impact the pressure check piston to overcome the spring force, moving the pressure check piston to a closed position, whereby fluid flows only through the orifice in the pressure check piston.

14 Claims, 2 Drawing Sheets

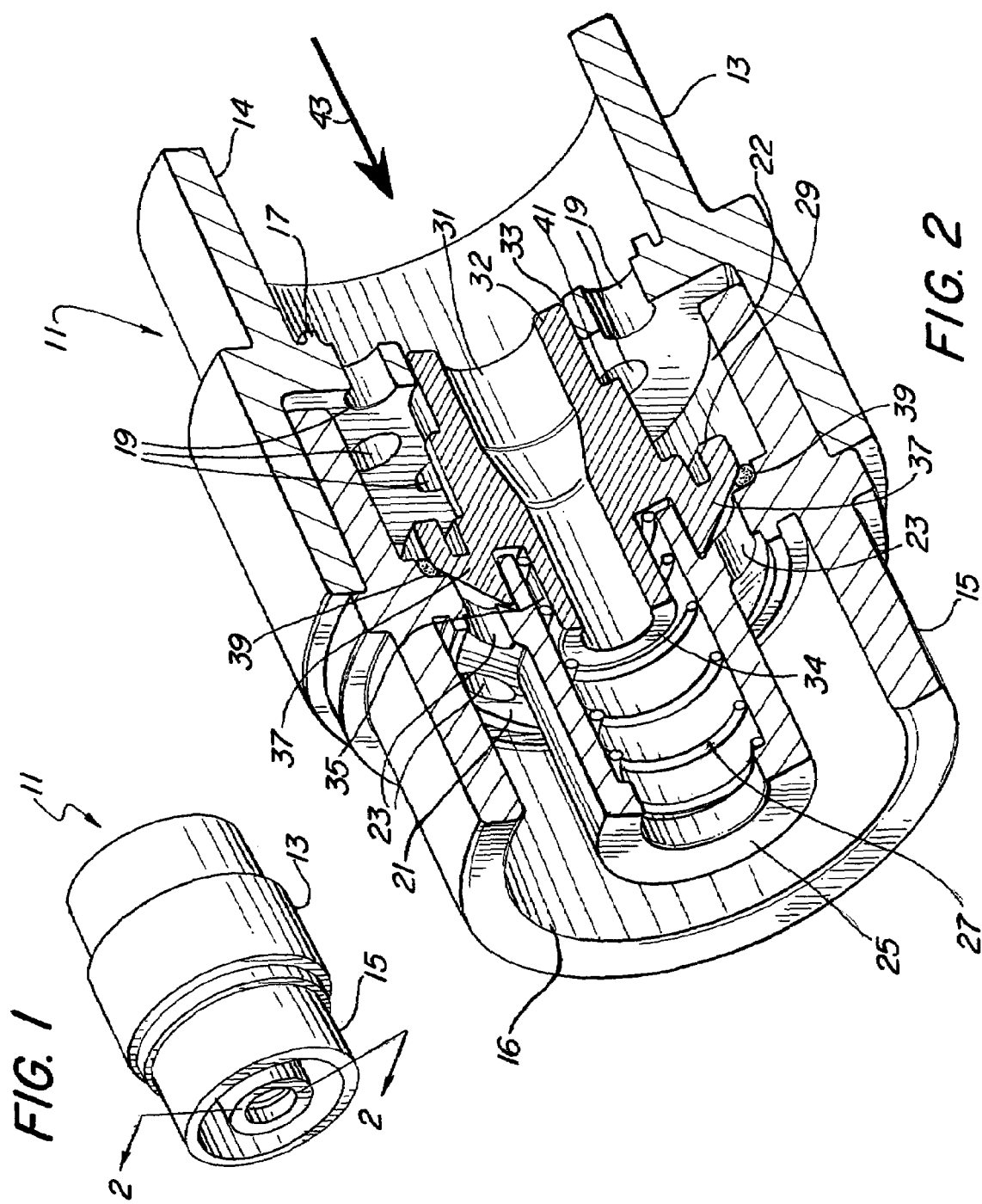

FLOW CONTROL VALVE

BACKGROUND OF THE INVENTION

1. Field of the Invention

The present invention relates generally to improvements in fluid flow control, and more particularly pertains to a new and improved fluid flow control valve wherein the output flow of the valve remains constant while fluid pressure may change at the input.

2. Description of the Prior Art

In the field of spa tubs, it is common practice to employ different water pressures to provide different system functions such as for ejecting water out of massage jets at high pressure and circulating for filtration purposes at lower pressure, for example. When it is desired to run a waterfall, fountain or other type of constant flow water feature as part of this multi-stage pressure system, these water features change flow output as the pressure in the system changes. The present invention overcomes that problem.

SUMMARY OF THE INVENTION

An inlet socket having separate fluid flow orifices for fluid flow in a longitudinal direction parallel to its central axis slidably attaches to an outlet socket having separate water flow orifices for fluid flow in a longitudinal direction parallel of its central axis. The inlet and outlet socket form a housing for a pressure check piston. The pressure check piston slidably engages the inlet socket and the outlet socket. The pressure check piston has an orifice for fluid flow in a longitudinal direction along its central axis. A spring, mounted along the central axis of the outlet socket, biases the pressure check piston towards the inlet socket, in a direction opposite to fluid flow. When biased in this direction, fluid flows through all fluid flow orifices in the inlet and outlet sockets and the pressure check piston. When fluid causes the pressure check piston to move against the compression spring, fluid flows only through the orifice in the pressure check piston.

BRIEF DESCRIPTION OF THE DRAWINGS

The exact nature of this invention, as well as its objects and advantages, will become apparent to those skilled in the art upon consideration of the following description of a preferred embodiment of the invention, as illustrated in the accompanying sheet of drawings in which:

FIG. 1 is a perspective of the flow control valve of the present invention.

FIG. 2 is a cross-section of the flow control valve of the present invention taken along line 2—2 of FIG. 1.

DETAILED DESCRIPTION OF THE PREFERRED EMBODIMENTS

Figure 3:
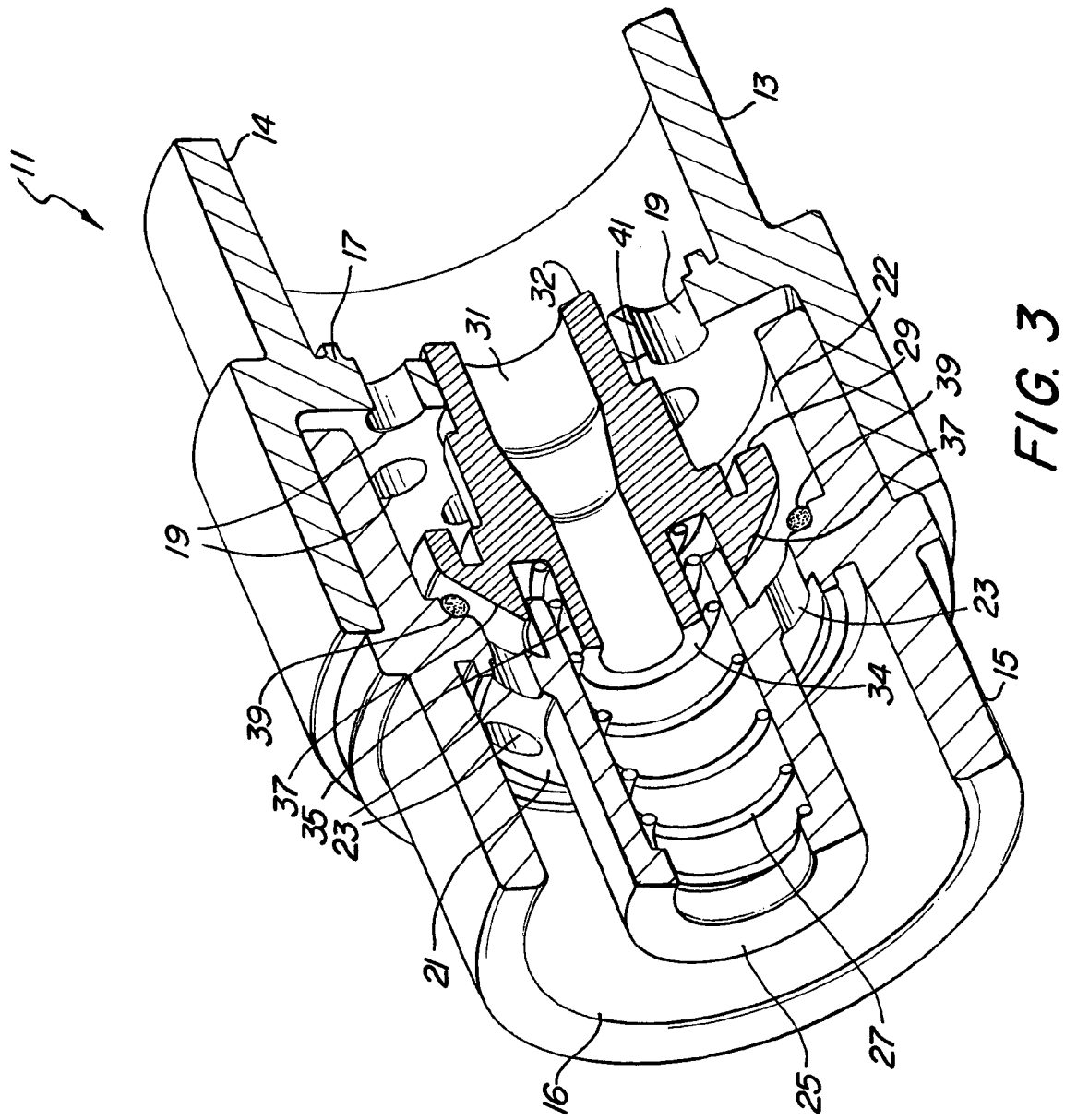
FIG. 3 is a cross-section of the flow control valve of the present invention taken along line 2—2 of FIG. 1.

FIG. 1 illustrates a preferred structure for the flow control valve 11 of the present invention as having an inlet socket 13 which mates with an outlet socket 15.

FIGS. 2 and 3 illustrate in cross-section the preferred structure for the flow control valve 11 of the present invention. The housing of the control valve 11 is made up of an inlet socket 13 and an outlet socket 15, each of which is uniquely constructed, as will be described more fully hereinafter. The material for these parts, as for the rest of the valve 11, may be made out of moldable plastic, or a formable metal, as desired, and as required by the pressure of fluid flow experienced by the valve.

A pressure check piston 29 is mounted for slidable movement along a longitudinal axis of the control valve 11. The longitudinal axis of control valve 11 is parallel to the fluid flow direction 43 as illustrated by an arrow. The pressure check piston 29 has an orifice 31 through it, along its longitudinal axes. The orifice is shaped preferably into a nozzle configuration, as shown, for permitting fluid flow 43 from the inlet 14 of the inlet socket 13 to outlet 16 of outlet socket 15 through the orifice 31 of the pressure check piston 29, regardless of the position of the piston 29. The outlet socket 15 is formed to mate with the inlet socket 13 in a manner that sealably contains the pressure check piston 29. A compression spring 27 is mounted in the outlet socket 15 along the longitudinal axes of the pressure check piston to bias the pressure check piston 29 towards the inlet 14 of inlet socket 13.

When the pressure check piston 29 is biased towards the inlet 14 of inlet socket 13, as shown in FIG. 3, the shoulders 41 of the pressure check piston 29 are in the proximity of a first wall 17 that is structurally a part of the inlet socket 13. First wall 17 has a plurality of orifices 19 for allowing fluid flow 43 to pass from the inlet 14 of inlet socket 13 into the chamber 22 formed by the first wall 17 and a second wall 21, which is integral with the outlet socket 15. Second wall 21 also has orifices 23 which allow fluid to flow from chamber 22 to the output 16 of output socket 15.

The second wall 21 is placed at an angle to the longitudinal axis of the control valve 11 rather than perpendicular, as is the first wall 17. A housing 25 for compression spring 27 is integrally formed at the outlet end of wall 21. The spring housing 25 has an orifice co-linear with the orifice 31 through the pressure check piston 29.

The first wall 17 of inlet socket 13 has a large orifice 33 therein in addition to the smaller orifices 19 surrounding it. The input end 32 of the pressure check piston 29 slidably engages the orifice 32 in the first wall 17. The output end 34 of the pressure check piston 29 is located within spring housing 25 so that compression spring 27 contacts the flange 37 of the pressure check piston 29, forcing it to move towards the first wall 17 of the inlet socket 13.

When the shoulder 41 of pressure check piston 29 is in the proximity of the first wall 17, as a result of the force exerted by compression spring 27, the pressure of fluid flow 43 into the input 14 of input lug 13 is insufficient to overcome the force of compression spring 27. As a result, fluid flow 43 flows through the flow path orifice 31 of the pressure check piston 29, through orifices 19 in the first wall 17, through orifices 23 in the second wall 21, through the orifice within spring housing 25, and out the outlet end 16 of outlet socket 15. In other words, all the fluid flow paths available within the housing of flow control valve 11 are open when the pressure check piston 13 is in the open position as shown in FIG. 3.

The orifice sizes in the first and second walls and in the pressure check piston and the spring constant of the compression spring acting on the pressure check piston may be designed to handle any range of pressures, as desired.

FIG. 2 illustrates the pressure, check piston 29 in a closed position. When the pressure flow 43 at the input 14 of input lug 13 increases to a point where fluid flow through the orifices 19 in the first wall 17 impinges upon the flange 37 of the pressure check piston 29, spring 27 is compressed until flange 37 abuts the second wall 21. The pressure check piston 29 is now in a closed position as shown in FIG. 2. In this position, the pressure check piston 29 abuts the second wall 21 and is pressed against pressure seal 39, which surrounds the orifices 23 in the second wall. This shuts off fluid flow through orifices 23 in the second wall. As a result, fluid flow from the input socket 13 flows only through flow path orifice 31 of the pressure check piston 29 to the output end 16 of output socket 15.

The flow path orifice 31 of the pressure check piston 29 reduces the increased pressure flow 43 at the input 14 of flow control valve 11 so that the level of flow at the output end 16 is maintained at the same level. So long as the fluid pressure flow 43 at the input end 14 stays at the higher level, pressure check piston 29 continues to block flow through orifices 23, and by way of its flow path nozzle orifice 31, reduces the input flow to maintain the output flow level constant, regardless of the changes in input fluid pressure.

The orifice sizes in the first and second walls and in the pressure check piston and the spring constant of the compression spring acting on the pressure check piston may be designed to handle any range of pressures, as desired.

What is claimed is:

1. A fluid flow control valve having an input and an output for maintaining a constant fluid flow at the output regardless of fluid pressure at the input, the control valve comprising:
   an inlet socket having a wall, transverse to fluid flow through the inlet socket, with a plurality of orifices, one of the orifices being larger than the others and on the longitudinal axis of the inlet socket;
   an outlet socket having a wall, transverse to fluid flow through the outlet socket, with a plurality of orifices, one of the orifices being larger than the others and on the longitudinal axis of the outlet socket, the outlet socket attached to the inlet socket forming a chamber between the wall of the inlet socket and the wall of the outlet socket;
   a pressure check piston having a first and second end with and a fluid flow orifice between the first and second end, the piston slidably engaging the longitudinal axis orifice in the wall of the inlet socket and slidably engaging the longitudinal axis orifice in the wall of the outlet socket; and
   a spring biasing the pressure check piston towards the inlet socket.

2. The fluid flow control valve of claim 1 further comprising a pressure seal located around the orifice in the outlet socket.

3. The fluid flow control valve of claim 2 wherein the second end of the pressure check piston is adapted to close the plurality of orifices in the wall of the outlet socket when the second end of the pressure check piston is pressed against the pressure seal.

4. The fluid flow control valve of claim 1 wherein fluid flows through the plurality of orifices in the wall of the inlet socket, the fluid flow path orifice in the pressure check piston, and the plurality of orifices in the wall of the outlet socket, when the pressure check piston is biased toward the inlet socket by the spring.

5. The fluid flow control valve of claim 1 wherein the first end of the pressure check piston is adapted to be impacted by fluid flow through the control valve.

6. The fluid flow control valve of claim 5 wherein the spring biasing the pressure check piston towards the inlet socket is adapted to be compressed by fluid flow impacting the pressure check piston.

7. The fluid flow control valve of claim 6 wherein fluid flows through the fluid flow path orifice in the pressure check piston when the fluid flow impacting the pressure check piston compresses the spring.

8. The fluid flow control valve of claim 7 further comprising a pressure seal located around the orifice in the outlet socket.

9. The fluid flow control valve of claim 8 wherein the second end of the pressure check piston is adapted to close the plurality of orifices in the wall of the outlet socket when the second end of the pressure check piston is pressed against the pressure seal by fluid flow impacting the pressure check piston at the first end.

10. The fluid flow control valve of claim 1 wherein the fluid flow path orifice of the pressure check piston has a nozzle cross-section.

11. A fluid flow control valve having a housing with a fluid input and a fluid output, for maintaining a constant fluid flow at the output in spite of an increase or decrease in fluid pressure at the input, the control valve comprising:
   a first wall, transverse to fluid flow through the housing at an inlet end of the housing, the wall having a plurality of orifices, one of the orifices being larger than the others and on the longitudinal axis of the housing;
   a second wall, transverse to fluid flow through the housing at an outlet end of the housing, the wall having a plurality of orifices, one of the orifices being larger than the others and on the longitudinal axis of the housing;
   a pressure check piston having a first and second end and a fluid flow path between the first and second end, the piston slidably engaging the longitudinal axis orifice in the first wall at the first end and slidably engaging the longitudinal axis orifice in the second wall at the second end; and
   a spring biasing the pressure check piston towards the inlet end of the housing.

12. The fluid flow control valve of claim 11 further comprising a pressure seal around the orifice in the second wall not engaged by the pressure check piston.

13. The fluid flow control valve of claim 12 wherein the second end of the pressure check piston is adapted to close the orifice when the second end of the pressure check piston is pressed against the pressure seal.

14. The fluid flow control valve of claim 11 wherein the fluid flow path orifice of the pressure check piston has a nozzle cross-section.

* * * * *